UNITED STATES PATENT OFFICE.

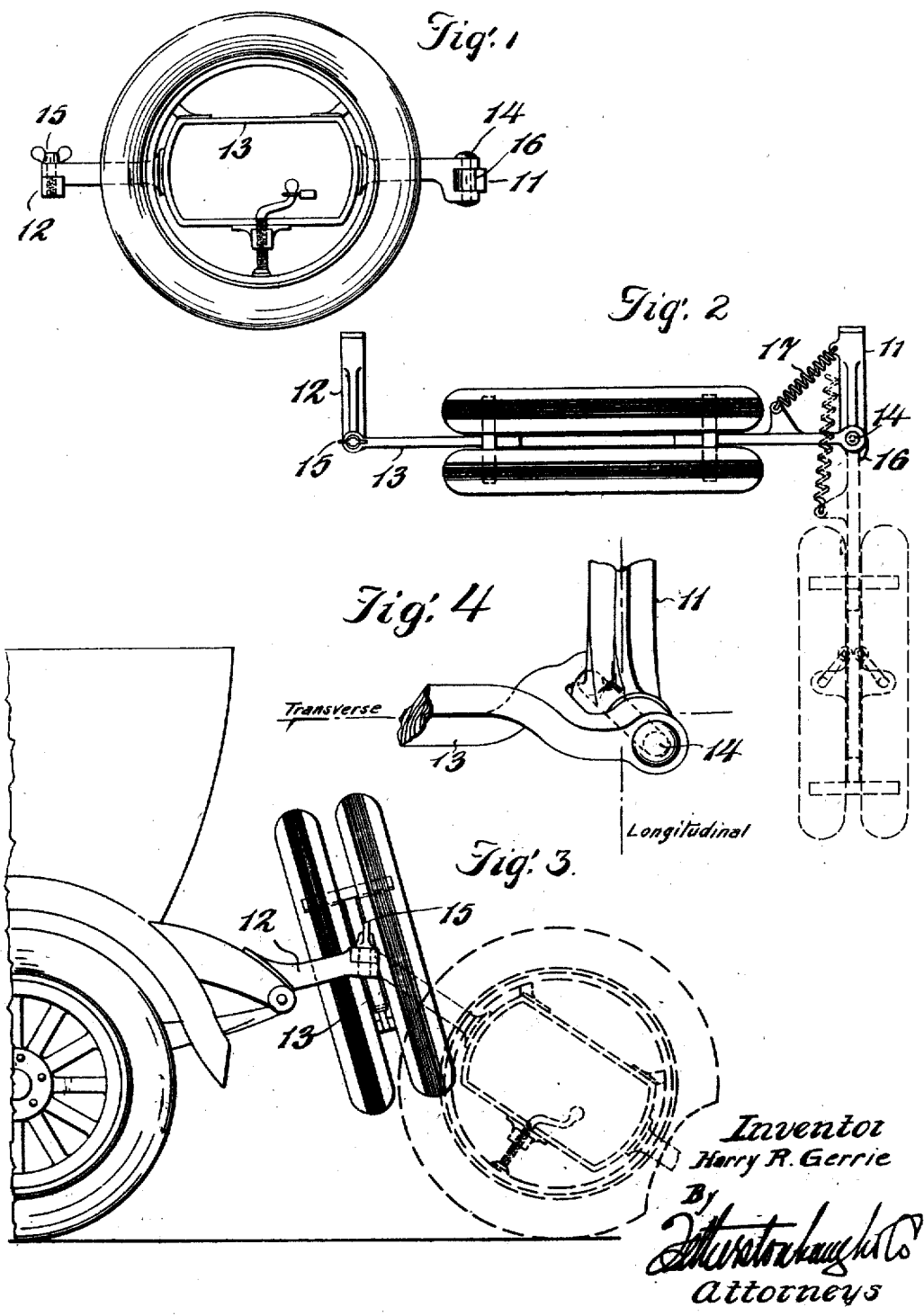

HARRY R. GERRIE, OF MONTREAL, QUEBEC, CANADA.

TIRE CARRIER.

1,419,965.   Specification of Letters Patent.   Patented June 20, 1922.

Application filed November 11, 1920. Serial No. 423,349.

*To all whom it may concern:*

Be it known that I, HARRY R. GERRIE, a subject of the King of Great Britain, and resident of the city of Montreal, in the Province of Quebec and Dominion of Canada, have invented certain new and useful Improvements in Tire Carriers, of which the following is a full, clear, and exact description.

This invention relates to improvements in tire holders for automobiles, and the object of the invention is to provide a holder from which either of two tires may be removed without displacing the other tire.

A further object is to provide a holder from which tires may be removed or in which tires may be inserted without lifting the same.

A still further object is to provide means for overcoming the interference of an automobile top with the removal or insertion of tires in a holder.

At the present time, the holders or carriers for spare tires of an automobile are rigid brackets at the rear of the car to which the tires are connected in a variety of ways. The weight of spare tires with their demountable rims, especially in the large sizes, is considerable, so that it is difficult to lift tires on or off the holder and, if the person driving happens to be a woman, the operation of changing tires is often a considerable hardship, especially with some types of holders which require that the tire be carefully and accurately guided into its proper place. Such careful and accurate guiding of a tire is next to impossible in cases where the operator's strength is taxed to the limit by the mere lifting of the tire. The matter is further complicated if the top of a car happens to be folded back, since in this position the top projects rearwardly beyond and laps down over the spare tires. It will also be found that in placing a jack under the rear axle, inspecting brakes or rear springs, and in washing the back of the car, the spare tires are a considerable obstacle. It frequently happens that the tire which it is desired to remove from the holder is the inner one, thus necessitating the removal of the outer tire before the inner tire can be reached and then the replacing of the tire first removed in the holder along with the tire which is being replaced. This condition just doubles the amount of lifting necessary for the change of tires.

According to the present invention, a tire holder is provided which will swing outwardly from the car, so that either of two tires may be removed with equal facility. The swinging holder may be pivoted in such a manner that it will swing downwardly so as to lower tires thereon to the level of the ground and enable the tires when detached from the holder to be rolled along the ground. In the same way, the punctured tire which is being replaced is rolled along the ground and into place relative to the holder and then attached without the necessity of lifting the tire at all. The downwardly swinging holder has the further advantage of disengaging tires from a folded-down top, so that the interference of the top is entirely eliminated. When it is desired to inspect the under part of a car or wash the back thereof, the tire holder may be swung out of the way.

The invention resides broadly in providing a pair of brackets projecting from the rear end of a chassis, to one of which brackets a tire carrier is hingedly connected, the other end of the carrier being adapted for releasable connection with the other bracket. The carrier extends transversely of the car at some distance from the rear thereof, so that one tire may be mounted on each side of the carrier. One end of the carrier may be disconnected from its supporting bracket and the carrier swung into alignment with the car to give access to the tires on each side thereof. The hinge pin securing the carrier may be disposed at such an angle that, as the carrier is swung out from the back of the car, it will also swing downwardly and lower the tires thereon to the ground in their normal running position. Either tire may be then disconnected from the carrier and rolled along the ground and, in the same way, a damaged tire may be rolled along the ground to the carrier and secured thereto without it being necessary to lift either tire. A spring may be provided between the carrier and one of the brackets or any suitable point on a vehicle to regulate the downward movement of the holder and also to assist the upward movement thereof.

In the drawings which illustrate the invention:—

Fig. 1 is a rear elevation of the device.

Fig. 2 is a plan view of the device illustrating the method of operation.

Fig. 3 is a side elevation illustrating the operation of the device in lowering the tires to the ground.

Fig. 4 is a plan view illustrating a detail of construction.

Referring more particularly to the drawings, 11 and 12 designate a pair of brackets rigidly attached to any suitable part of a car and 13 designates a carrier member hingedly connected at one end to one of the brackets by means of a pin 14 which is so connected as to be incapable of removal without great labor, the pin for example being riveted in place. The other bracket or the opposite end of the carrier is provided with a wing-headed screw by means of which the carrier may be releasably attached to the bracket 12. The carrier may be of any suitable form, that indicated in the drawings being considered the best as it does not touch the tires proper but engages only the rims thereof. It will be understood, however, that the form of the carrier in this respect is immaterial. The bracket 11 or the carrier 13 may be provided with a stop 16 adapted to engage the other member to limit the swing of the carrier. The tires are attached to the carrier in any suitable manner to be proof against theft.

The hinge pin may be vertically disposed as shown in Figures 1 and 2 or may be disposed at an inclination as shown in Figures 3 and 4. The direction and amount of inclination of the pin are such that the carrier will swing downwardly simultaneously with its movement away from the car, so as to lower tires carried thereon to the ground in normal position, that is to say, the tires will occupy vertical planes. In most instances the desired placing of the tires on the ground will be effected by a suitable inclination of the hinge pins laterally with respect to the longitudinal axial line of the car but it may, under certain conditions, be found necessary or desirable to incline the pin also in the axial direction of the car or to incline the pin only in the axial direction of the car.

A spring 17 may be connected between the carrier and the bracket 11 or any other suitable part of the car, for the purpose of easing down the tires to the ground and assisting in swinging the same up to carrying position.

It will be understood that the invention, while shown only as a carrier for spare tires, applies also to the carrying of spare wheels, which will be attached in any suitable manner one on each side of the carrier 13.

The operation of the device is extremely simple and it is believed will be understood without further description. The carrier being for all practical purposes permanently attached to the bracket 11, as previous stated, is proof against theft and, if the tires are properly attached to the carrier, neither they nor the carrier can be removed from the car by any unauthorized person, but the screw 15 being unlocked may be removed by any garage or washing station operator as may be necessary to clear the back of the car for work. In the following claims the term "tire carrier" will be understood as a generic term including both tire and spare wheel carriers.

Having thus described my invention, what I claim is:—

1. A tire or wheel carrier comprising a swinging carrier bar normally disposed to extend across the rear end of a vehicle and having one end releasably connected to the vehicle, and an inclined pin establishing a pivotal connection between the other end of the bar and the vehicle and serving to permit the bar to swing downwardly and outwardly from the vehicle when released.

2. A tire carrier comprising a pair of brackets, a carrier member having releasable connection at one end with one of said brackets, and a hinge pin connecting the other end of said carrier member to the remaining bracket, said pin being inclined to permit the carrier member to swing downwardly and outwardly from the vehicle to which the carrier is attached.

3. A tire carrier comprising a pair of brackets, a carrier member having one end releasably connected with one of said brackets, a hinge connecting the other end of the carrier member to the remaining bracket, said brackets, said hinge being inclined so that the carrier member will swing downwardly and outwardly from the vehicle to which the carrier is attached, and a spring connected to the carrier member to ease same in its downward movement.

4. A tire carrier comprising a pair of brackets, a carrier member having releasable connection at one end with one of said brackets, and an inclined hinge pin connecting the other end of the carrier to the remaining bracket and permitting the carrier to swing downwardly and outwardly to lower the tires thereon into contact with the ground, the inclination of the pin being such that the carrier will dispose the tires in vertical planes at the time the same reach the ground.

5. A tire or wheel carrier, comprising a swinging carrier bar normally disposed to extend across the rear of a vehicle, a releasable connection between the vehicle and one end of the bar, a hinge connection between the vehicle and the other end of the bar, and means for effecting lowering of the carrying bar upon outward swinging movement thereof with respect to the vehicle.

6. The combination with the structure recited in claim 5, of means operable to ease the carrier member in the downward and outward movement thereof and to assist in returning the carrier member to normal position.

7. In a tire carrier, a pair of brackets, a carrier member, the plane of which is inclined, a pin hingedly connecting the carrier member to one of said brackets, said pin being inclined to swing the carrier member from its normal inclined plane into a vertical plane during swing of the carrier member about said pin.

8. A device according to claim 7, in which the pin is also inclined to produce a downward swing of the carrier member simultaneously with the other movements thereof.

9. In a tire carrier, a pair of brackets, a carrier member having releasable connection at one end with one of said brackets, a pin permanently and hingedly connecting the other end of said carrier member to the remaining bracket, said pin being so inclined that the carrier member will swing downwardly and away from a vehicle to which the carrier is attached, and a spring connected between the carrier member and a fixed point arranged to ease down the carrier member and tires thereon during downward swing of the member and to assist in raising the carrier member and tires thereon.

10. A tire carrier for vehicles comprising a bar extending transversely across the rear end of a vehicle and adapted to carry a tire on either side thereof, said bar being mounted to swing in an inclined path to lower the tires carried thereon into proximity with the ground and to expose either tire for removal from the carrier without necessitating lifting of the tire.

In witness whereof, I have hereunto set my hand.

HARRY R. GERRIE.